United States Patent
Guey et al.

(10) Patent No.: US 7,848,468 B2
(45) Date of Patent: Dec. 7, 2010

(54) ADAPTIVE PILOT SYMBOL ALLOCATION METHOD AND APPARATUS

(75) Inventors: Jiann-Ching Guey, Cary, NC (US); Afif Osseiran, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 872 days.

(21) Appl. No.: 11/743,332

(22) Filed: May 2, 2007

(65) Prior Publication Data

US 2008/0219361 A1    Sep. 11, 2008

Related U.S. Application Data

(60) Provisional application No. 60/893,755, filed on Mar. 8, 2007.

(51) Int. Cl.
*H03D 1/04* (2006.01)
(52) U.S. Cl. ....................................... 375/346
(58) Field of Classification Search ................ 375/346, 375/295, 360, 316; 370/337, 347
See application file for complete search history.

(56) References Cited

U.S. PATENT DOCUMENTS

2006/0146867 A1    7/2006    Lee et al.
2008/0080646 A1*   4/2008    Bottomley et al. .......... 375/341

OTHER PUBLICATIONS

Co-pending U.S. Appl. No. 11/848,581, filed Aug. 31, 2007.
Co-pending U.S. Appl. No. 11/432,146, filed May 11, 2006.
Nilsson, Rickard et al. "An Analysis of Two-Dimensional Pilot-Symbol Assisted Modulation for OFDM." Proc. IEEE Intern. Conf. on Personal Wireless Communications (ICPWC '97), Mumbai (Bombay), India, pp. 71-74, 1997.
Sorenson, H. W. Parameter Estimation: Principles and Problems. New York, NY, Marcel Dekker 1980, pp. 149-152. ISBN: 0824780418.
Guey, Jiann-Ching. "Synchronization Signal Design for OFDM Based On Time-Frequency Hopping Patterns." IEEE International Conference on Communications (ICC 2007). Glasgow, Scotland, Jun. 24-28, 2007.
Zhu, J. et al. "A Low-Complexity Channel Estimator for OFDM Systems in Multipath Fading Channels." 15th IEEE International Symposium on Personal, Indoor and Mobile Radio Communications, Sep. 5-8, 2004, vol. 3, pp. 1978-1982.
Tong, L. et al. "Pilot-Assisted Wireless Transmissions: General Model, Design Criteria, and Signal Processing." IEEE Signal Processing Magazine, vol. 21, No. 6, Nov. 2004, pp. 12-25.

* cited by examiner

*Primary Examiner*—Khai Tran
(74) *Attorney, Agent, or Firm*—Coats & Bennett, P.L.L.C.

(57) ABSTRACT

According to one embodiment, a wireless communication device estimates channel response based on a reduced-density common pilot signal comprising a plurality of regularly spaced common pilot symbols when the reduced-density common pilot signal is sufficient for estimating the channel response with a desired accuracy. The wireless communication device estimates the channel response based on the reduced-density common pilot signal and one or more additional pilot symbols adaptively allocated to the wireless communication device when the reduced-density common pilot signal is insufficient for estimating the channel response with the desired accuracy.

26 Claims, 5 Drawing Sheets

ADAPTIVE PILOT SYMBOL ALLOCATION METHOD AND APPARATUS

CROSS REFERENCE TO RELATED APPLICATIONS

This application claims priority benefit under 35 U.S.C. §119(e) from U.S. Provisional Application No. 60/893,755, filed Mar. 8, 2007, which is incorporated herein by reference in its entirety.

BACKGROUND

The present invention generally relates to pilot symbol allocation in wireless communication systems, and particularly relates to adaptive allocation of pilot symbols based on changing channel conditions.

In a wireless communication system, known symbols referred to as common pilot symbols are transmitted across a wireless communication channel to receiving devices. The receiving devices use the common pilot symbols for estimating channel response which in turn is used to coherently demodulate received data symbols. For example, in an Orthogonal Frequency Division Multiplexing (OFDM) system, common pilot symbols are transmitted across the time-frequency plane. An OFDM receiving device estimates the time-frequency response of the channel based on the common pilot symbols in order to perform coherent data symbol demodulation. Since the time-frequency response of an OFDM channel is a slow-varying two-dimensional process, the common pilot symbols essentially sample this process and therefore need to have a density that is high enough for receiving devices to reconstruct (or interpolate) the full response.

The minimum density required for aliasing-free reconstruction of a communication channel's response is referred to as the Nyquist rate in sampling theory. The Nyquist rate is inversely proportional to the channel's maximum delay-Doppler spread. Because common pilot symbols occupy the radio resource that otherwise could be used for data transmission, pilot symbol overhead is kept as low as possible. This is especially critical for advanced cellular communication systems in which a large number of base stations with multiple antennas may be simultaneously visible to a terminal. Large pilot signal overhead can significantly limit the radio resource available for data transmission.

Common pilot signal density is conventionally set at about twice the Nyquist rate to cover worst-case channel conditions. Correspondingly, conventional wireless communication systems transmit common pilot symbols at a fixed spacing corresponding to approximately twice the Nyquist rate while inserting data symbols between the pilot symbols. For example, common pilot signal density is conventionally set at about twice the Nyquist rate in both the time and frequency domains for OFDM communication systems. For a mobile system operating at a carrier frequency of 5 GHz, the maximal Doppler spread ($\bar{\upsilon}$) and delay spread ($\bar{\tau}$) are given by:

$$\bar{\upsilon} \approx 2000(\pm 1000) \text{ Hz},$$

$$\bar{\tau} \approx 7.8125 \text{ } \mu\text{sec} \quad (1)$$

where the maximal Doppler and delay spreads correspond to a vehicle speed of 200 kmph and a maximum scatterer spread over 2343.75 meters.

In order to meet the time domain Nyquist sampling criterion, one common pilot symbol is transmitted every $1/\bar{\upsilon}$ seconds. Since the duration of the common pilot symbol $T_s$ is just the symbol length of the OFDM system, there can be at most $1/(\bar{\upsilon}T_s)$ OFDM data symbols between two consecutive common pilot symbols. Similarly, the number of sub-carriers between two consecutive common pilot symbols in the frequency domain can be at most $T_s/\bar{\tau}$ (ignoring cyclic prefix). Therefore, the minimum common pilot signal density is $\bar{\upsilon}\bar{\tau}$, which is 1/64 for the parameters given above.

When common pilot symbols are transmitted at twice the Nyquist rate in both the time and frequency domains, the pilot signal density for the typical OFDM environment described above is approximately 1/16. The situation worsens as carrier frequency and cell size increase. For a terminal that is in the coverage area of four base stations, 25% of the radio resource is conventionally occupied by the common pilot signal. This estimate does not account for multiple antennas that may be used to transmit common pilot symbols for spatial multiplexing systems such as Multiple Input Multiple Output (MIMO) systems.

When the common pilot signal density is only marginally above the Nyquist rate, the pilot observation window may have to be extended beyond the data transmission, resulting in delay that may not be acceptable for certain applications. Furthermore, a common pilot signal having a fixed density is very inefficient for an environment that has a large variation in the delay-Doppler spreads experienced by different users. A fixed, high-density common pilot signal benefits users only in extreme cases such as when a user is moving at a very high rate of speed or experiences a highly dispersive channel. All other users do not require a high-density common pilot signal to accurately estimate channel response, and thus, bandwidth is unnecessarily consumed by transmitting unneeded pilot symbols instead of data symbols.

SUMMARY

According to the methods and apparatus taught herein, a reduced-density common pilot signal is utilized instead of a conventional higher-density common pilot signal. The common pilot signal has a reduced density in that it is based on a sampling rate near the Nyquist rate. The actual sampling rate depends on several parameters such as the radio environment and mobile device velocity. In some embodiments, the reduced-density common pilot signal is based on a sampling rate of approximately 1.25 times the Nyquist rate. In other embodiments, the sampling rate may be greater or less than 1.25 times the Nyquist rate, including a rate less than the Nyquist rate.

Conventionally, receiving devices can perform accurate channel estimation based on a conventional high-density common pilot signal because the conventional pilot signal is designed for worst-case channel conditions. Here, not all receiving devices are expected to perform accurate channel estimation based only on the reduced-density common pilot signal. However, the reduced-density common pilot signal is selected so that a desired number of the receiving devices can perform accurate channel estimation based only on the reduced-density common pilot signal.

Accordingly, one or more additional pilot symbols are adaptively allocated to receiving devices based on need, i.e., to those devices that cannot estimate channel response with a desired accuracy based only on the reduced-density common pilot signal. Adaptive allocation of additional pilot symbols enables a receiving device to accurately estimate channel response based on both the reduced-density common pilot signal and the additional pilot signal when needed. For example, receiving devices that cannot wait for the next regularly scheduled common pilot symbol because they have a stringent delay requirement may be allocated one or more additional pilot symbols. Additional pilot symbols may be allocated to receiving devices subjected to an extremely dispersive channel or which are moving at high rates of speed. Receiving devices that are able to perform accurate channel estimation based only on the reduced-density pilot signal are not allocated additional pilot symbols, and thus receive the benefit of higher data symbol density as compared to conventional systems. That is, more data symbols may be transmitted to the receiving devices per unit time (and optionally per unit frequency for OFDM devices) because fewer common pilot symbols are transmitted to the receiving devices. Only receiving devices requiring additional pilot symbols experience reduced data symbol density when allocated additional pilot symbols.

Receiving devices may indicate to the transmitting device when additional pilot symbols are needed for accurate channel estimation. Alternatively, the transmitting device may blindly detect this condition, e.g., based on a pilot signal transmitted by the receiving devices. Either way, the transmitting device adaptively allocates additional pilot symbols to receiving devices requiring additional pilot symbols. Receiving devices not requiring additional pilot symbols perform channel estimation based only on the reduced-density common pilot signal. On the other hand, devices requiring additional pilot symbols perform channel estimation based on both the reduced-density common signal and the additional pilot symbols adaptively allocated to the devices. The devices may employ a liner estimator such as a Minimum Mean-Square Error (MMSE) estimator for generating a channel response estimate based on the reduced-density common pilot symbols and the adaptively allocated pilot symbols. The linear estimator may operate on all common pilot symbols received within a pilot observation window or may operate on a subset of the common pilot symbols to reduce channel estimation complexity and improve channel estimation performance.

According to one embodiment, a wireless communication device estimates channel response based on a reduced-density common pilot signal comprising a plurality of regularly spaced common pilot symbols when the reduced-density common pilot signal is sufficient for estimating the channel response with a desired accuracy. The wireless communication device estimates the channel response based on the reduced-density common pilot signal and one or more additional pilot symbols adaptively allocated to the wireless communication device when the reduced-density common pilot signal is insufficient for estimating the channel response with the desired accuracy.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
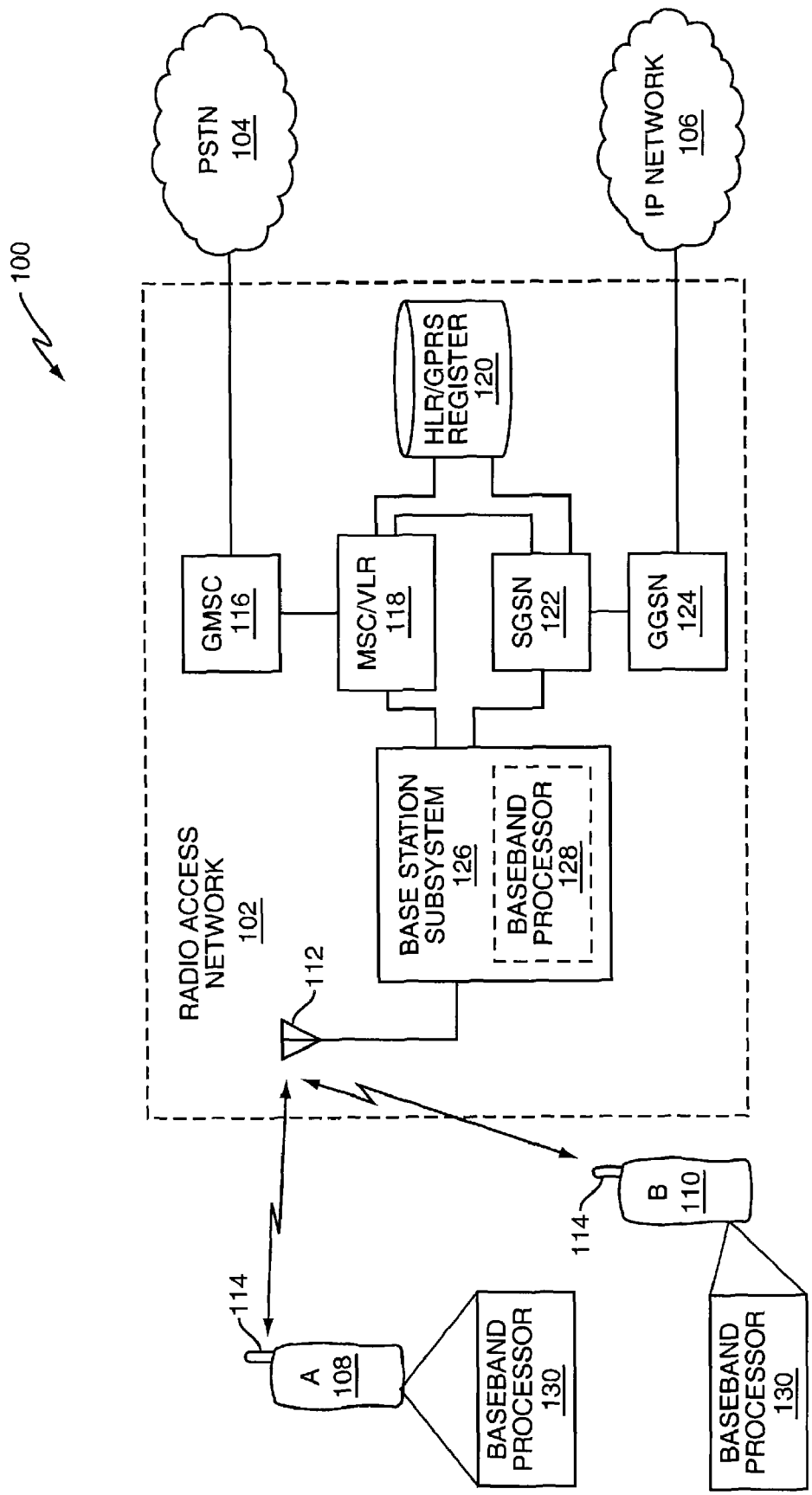
FIG. 1 is a block diagram of an embodiment of a wireless communication system including mobile devices serviced by a radio access network.

FIG. 1 illustrates an embodiment of a wireless communication system 100 including a Radio Access Network (RAN) 102 coupled to the Private-Switched Telephone Network (PSTN) 104 and an IP network 106 such as the Internet. The RAN 102 provides wireless communication services to mobile devices 108, 110 such as mobile phones. The mobile devices 108, 110 and the RAN 102 communicate over wireless communication channels. Each mobile device 108, 110 routinely estimates channel response and uses the channel response estimate to perform coherent demodulation of received data symbols. A reduced-density common pilot signal is transmitted from the RAN 102 to the mobile devices 108, 110 over a forward communication link (also referred to as a downlink) to facilitate channel response estimation. The reduced-density common pilot signal comprises a series of known pilot symbols equally spaced in time (and optionally in frequency for OFDM systems).

Spacing between the reduced-density common pilot symbols is greater than the pilot symbol spacing employed in a conventional wireless communication system, and thus, the common pilot signal has a reduced symbol density. The reduced-density common pilot signal is not selected to address worst-case channel conditions within the communication system 100. Instead, the symbol density of the common pilot signal is selected to enable a desired number of the mobile devices 108, 110 to estimate channel response with a desired accuracy based only on the common pilot signal (e.g., 70% of the mobile devices 108, 110 or more). The desired accuracy of the channel response estimate may correspond to a desired bit error rate, signal-to-noise or signal-to-interference-plus-noise ratio, bit decoding accuracy or the like. Regardless as to the particular channel estimation accuracy metric, additional pilot symbols are adaptively allocated only to the mobile devices 108, 110 which require additional pilot symbols for generating an accurate channel response estimate.

That is, the mobile devices 108, 110 that cannot wait for the next regularly-scheduled common pilot symbol to perform accurate channel estimation are allocated one or more additional pilot symbols. This may include mobile devices 108, 110 having a stringent delay requirement and mobile devices 108, 110 subjected to extreme channel conditions such as highly dispersive channels and very high rate of speed. Accordingly, these mobile devices 108, 110 may use the additional pilot symbols along with the regularly transmitted, reduced density common pilot symbols to perform accurate channel response estimation.

The number of mobile devices 108, 110 requiring additional pilot symbols depends on the symbol spacing selected for the reduced-density common pilot signal. The greater the time gap between common pilot symbols (and optionally frequency gap for OFDM environments), the more mobile devices 108, 110 that will need additional pilot symbols to accurately estimate channel response. Preferably, the reduced-density common pilot signal is based on a sampling rate near the Nyquist rate. The actual sampling rate depends on several parameters such as the radio environment and mobile device velocity. In some embodiments, the reduced-density common pilot signal is based on a sampling rate of approximately 1.25 times the Nyquist rate instead of twice the Nyquist rate. In other embodiments, the sampling rate may be above or below the 1.25 Nyquist rate, including a rate less than the Nyquist rate.

Symbol spacing for the reduced-density common pilot signal may be selected so that a desired number of mobile devices 108, 110 are able to generate an accurate channel response estimate based only on the reduced-density common pilot signal. This way, data symbol density may be increased for the desired number of mobile devices 108, 110 by selecting the appropriate density of common pilot symbols. Symbol spacing for the reduced-density common pilot signal depends on the particular system 100 deployed and system environment. Accordingly, any reduced-density common pilot signal is within the scope of the embodiments disclosed herein.

Additional pilot symbols are adaptively allocated to the mobile devices 108, 110 that need the additional pilot symbols for accurately estimating channel response. For example, a first one 108 of the mobile devices 108, 110 may accurately estimate channel response based only on the reduced-density common pilot signal. However, a second one 110 of the mobile devices 108, 110 may require one or more additional pilot symbols before the next regularly scheduled common pilot symbol arrives. Accordingly, the RAN 102 adaptively allocates one or more additional pilot symbols to the second mobile device 110 when needed for accurate channel estimation. This way, the first mobile device 108 receives the benefit of increased data symbol density. Only the second mobile device 110 requires additional pilot symbols and thus receives less data symbols per unit of time (and optionally per unit of frequency for OFDM systems).

Those skilled in the art will readily recognize that the adaptive pilot allocation embodiments disclosed herein apply equally to both forward communication links and reverse communication links (also referred to as uplinks). Accordingly, while the embodiments disclosed herein may reference a particular communication direction for ease of explanation only, the teachings disclosed herein are applicable to both forward and reverse communication directions. For example, while the preceding description referenced a forward communication link, the mobile devices 108, 110 may transmit a reduced-density common pilot signal to the RAN 102 over a reverse communication link. Accordingly, the mobile devices 108, 110 may adaptively allocate one or more additional pilot symbols to the RAN 102 when needed by the RAN 102 for accurately estimating channel response of either reverse communication link.

With this understanding in mind, operation of the wireless communication system 100 is described next in more detail with reference to forward link communication. As such, the RAN 102 is a transmitting device and the mobile devices 108, 110 are receiving devices. However, the teachings disclosed herein also apply to the mobile devices 108, 110 when they are transmitting devices and the RAN is the receiving device. Also, the wireless communication system 100 may employ any signal modulation scheme. For example, the communication system 100 may employ a multi-carrier modulation scheme such as OFDM or a single carrier modulation scheme. Further, the RAN 102 may utilize a single base station antenna 112 or a multi-antenna array (not shown). Likewise, the mobile devices 108, 110 may also use a single antenna 114 or multi-antenna array (not shown). The communication system 100 may conform to any radio access topology that uses pilot signals for enabling channel response estimation such as WCDMA, GSM, GPRS/EDGE, UMTS, etc. For ease of description only, operation of the RAN 102 is described next based on the GPRS/EDGE mobile communication standard. However, those skilled in the art will readily recognize that the teachings disclosed herein equally apply to other radio access topologies.

The RAN 102 includes a GSM Gateway Mobile Switching Center (GMSC) 116 for providing a gateway between the RAN 102 and the PSTN 104. The RAN 102 also includes a Mobile services Switching Center (MSC) and a Visitor Location Register (VLR) 118 for supporting circuit-switched communication. The MSC/VLR 118 performs circuit switching functions, provides connections to the PSTN 104, and contains subscriber information necessary for providing circuit switched services. A central database 120 maintains the Home Location Register (HLR) which contains information associated with each mobile phone subscriber authorized to use the RAN 102.

The RAN 102 further includes complimentary components 122, 124 for supporting packet-switched communication. A first packet-switched communication support node 122 such as a Serving GPRS support node (SGSN) controls connections between the RAN 102 and the mobile devices 108, 110. The SGSN 122 performs session management and GPRS mobility management such as handovers and paging. The SGSN 122 has access to a GPRS register maintained by the central database 120 which stores SGSN addresses and maintains GPRS subscriber data and routing information. A second packet-switched communication support node 124 such as a Gateway GPRS Support Node (GGSN) provides a gateway between the RAN 102 and the IP network 106 and/or other GPRS networks (not shown). The GGSN 124 implements authentication and location management functions.

The RAN 102 also includes a radio access node 126 such as a Base Station Subsystem (BSS) for handling traffic and signaling between the mobile devices 108, 110 and the RAN 102. The BSS 126 transcodes speech channels, allocates radio channels, performs paging, manages quality of transmission and reception over the air interface and many other tasks related to the RAN 102 as is well known in the art. The BSS 102 includes a baseband processor 128 that implements functions that include, but are not limited to, channel estimation and coherent data symbol demodulation for reverse link communication. For forward link communication, the BSS baseband processor 128 generates data symbols and the reduced-density common pilot signal for transmission to the mobile devices 108, 110 and also allocates additional pilot symbols when needed by a mobile device 108, 110 for accurately estimating channel response.

Figure 2:
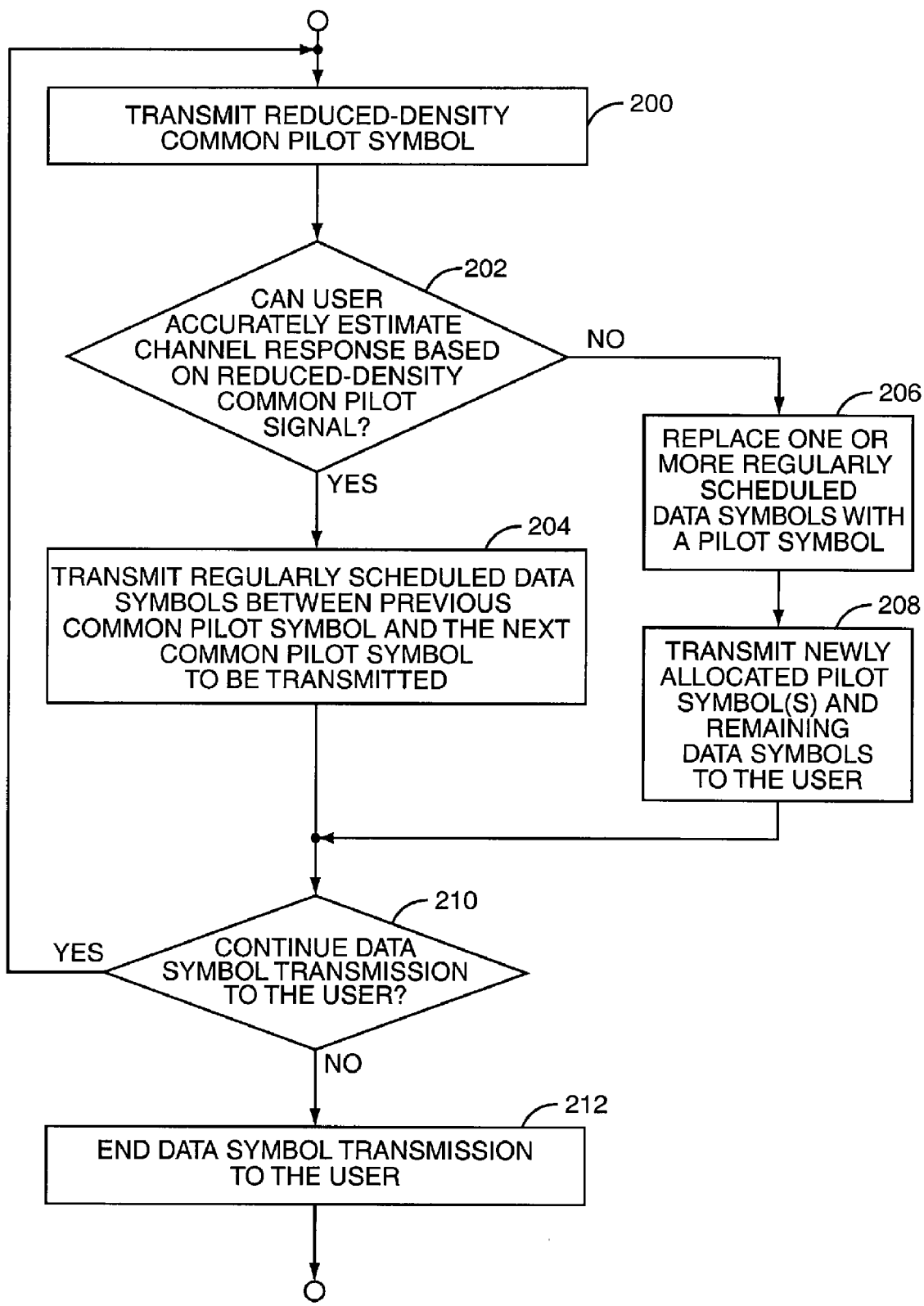
FIG. 2 illustrates a logic flow diagram for one embodiment of an adaptive pilot symbol allocation method.

FIG. 2 illustrates a broad embodiment of a method of adaptive pilot symbol allocation. The method "begins" with the transmission of a pilot symbol generated by the BSS baseband processor 128 (Step 200). The pilot symbol is part of a reduced-density common pilot signal transmitted by the BSS 126. The common pilot symbol is transmitted to all mobile devices 108, 110 in communicative contact with the BSS 126. The BSS baseband processor 128 determines whether one or more of the mobile devices 108, 110 can accurately estimate channel response based on the reduced-density common pilot signal (Step 202). In one embodiment the BSS baseband processor 128 blindly makes this determination based on a pilot signal received from the mobile devices 108, 110. In another embodiment, the BSS baseband processor 128 receives a control signal from the mobile devices 108, 110 indicating whether additional pilot symbols are needed for accurate channel response estimation.

Either way, the method continues with the BSS 126 transmitting regularly-scheduled data symbols interposed between common pilot symbols to the mobile devices 108, 110 not requiring additional pilot symbols (Step 204). This way, data symbol density is not decreased for the mobile devices 108, 110 not requiring additional pilot symbols. However, if a particular mobile device 108, 110 requires one or more additional pilot symbols before receipt of the next common pilot symbol, the BSS baseband processor 128 replaces one or more regularly-scheduled data symbols targeted to that mobile device 108, 110 with a pilot symbol (Step 206). Accordingly, data symbol density decreases because one or more data symbols are replaced by pilot symbols in the data transmission window.

The newly allocated pilot symbol(s) and remaining data symbols are transmitted to the target mobile device 108, 110 during the current data transmission window (Step 208). In one embodiment, the target mobile device 108, 110 becomes aware of the newly allocated pilot symbols based on a signal transmitted by the BSS 126 to the target device 108, 110. The signal indicates that the newly allocated pilot symbols are available for use by the target device 108, 110. In another embodiment, the target mobile device 108, 110 blindly detects the newly allocated pilot symbols, e.g., by monitoring data channels for inserted pilot symbols. Either way, the adaptively allocated pilot symbol(s) are used to accurately estimate channel response before the next regularly-scheduled common pilot symbol is received.

The method continues with the BSS baseband processor 128 determining whether data symbol transmission is to continue (Step 210). If so, the next regularly-scheduled common pilot symbol is transmitted (Step 200) and the BSS baseband processor 128 continues interjecting data symbols between regularly-scheduled common pilot symbols as previously described (Steps 202, 204 and 206). Conversely, the BSS baseband processor 128 terminates data symbol transmission when no further data symbols are to be transmitted to a particular mobile device 108, 110 (Step 212).

Figure 3:
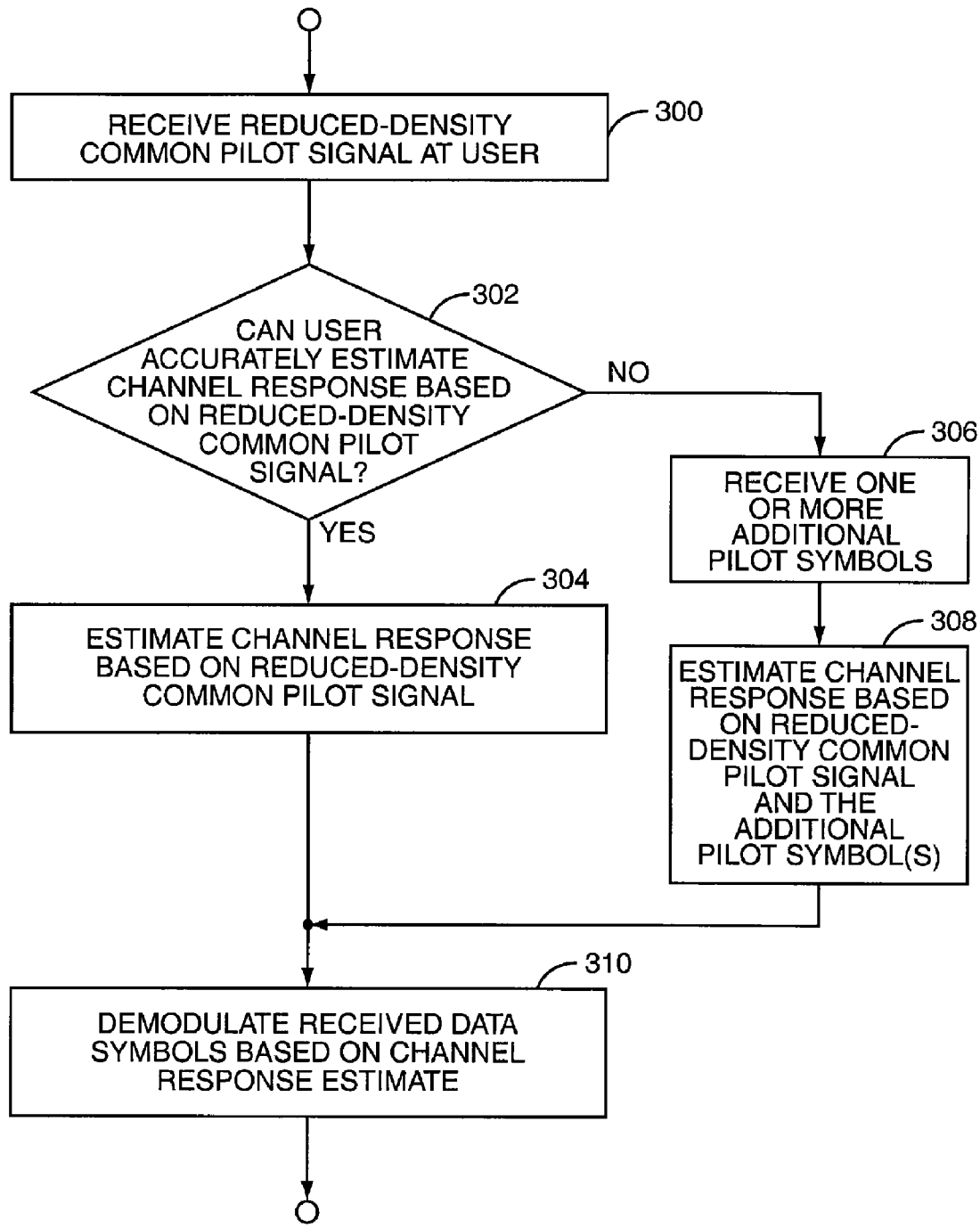
FIG. 3 illustrates a logic flow diagram for one embodiment of a channel response estimation method based on a reduced-density common pilot signal and adaptively allocated pilot symbols.
Figure 4:
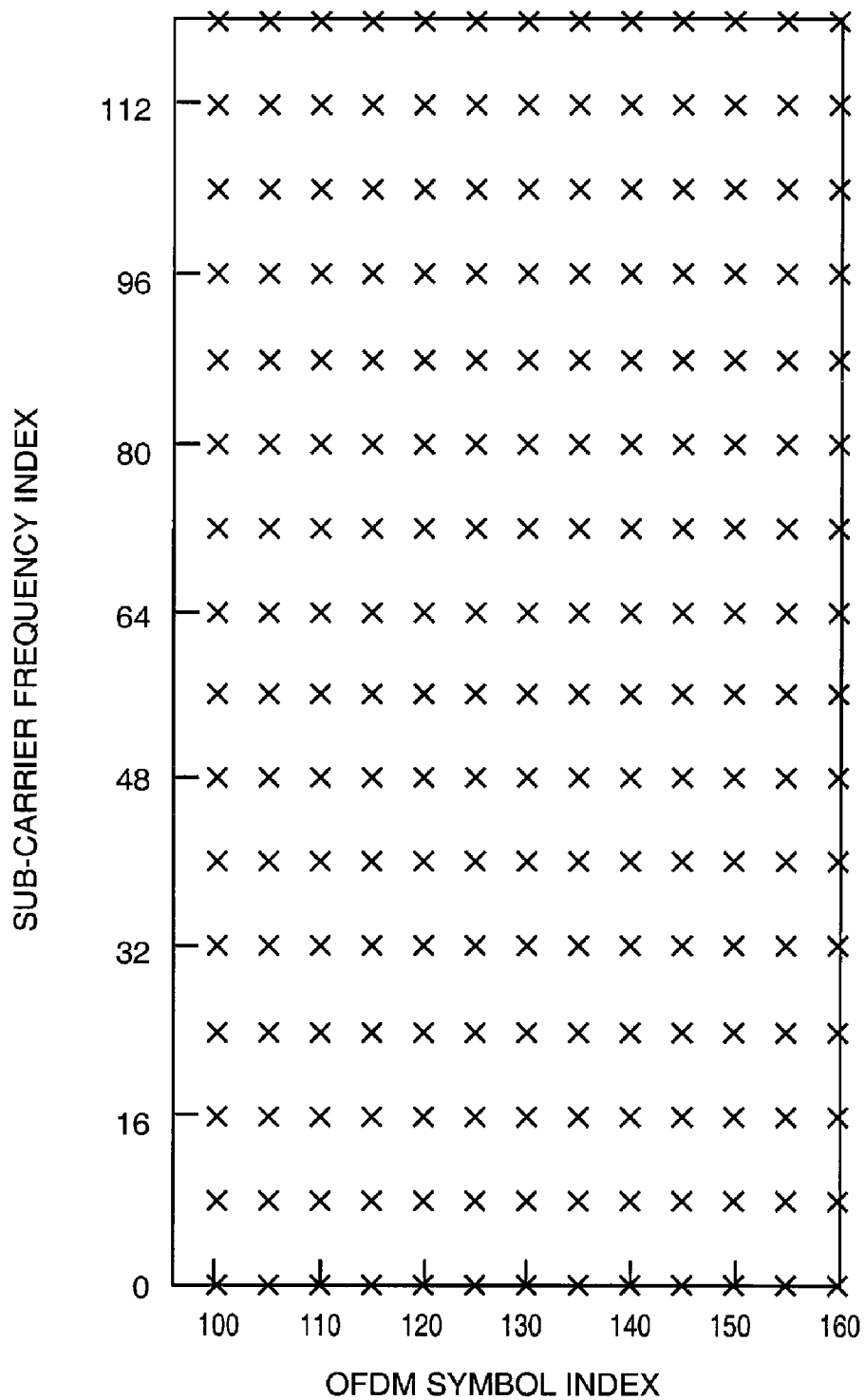
FIG. 4 illustrates a time-frequency plot diagram of a conventional OFDM pilot signal.

FIG. 3 illustrates a broad embodiment of a method of channel response estimation based on the reduced-density common pilot signal and adaptively allocated pilot symbols. The method is described next with reference to FIGS. 4 and 5. FIG. 4 illustrates an exemplary conventional OFDM common pilot signal based on a sampling rate of approximately twice the Nyquist rate of a communication channel. The conventional common pilot signal includes pilot symbols regularly spaced in time (shown as OFDM symbol index on the x-axis) and frequency (shown as sub-carrier frequency index on the y-axis). A common pilot symbol is transmitted every $5^{th}$ OFDM symbol and every $8^{th}$ sub-carrier frequency.

Figure 5:
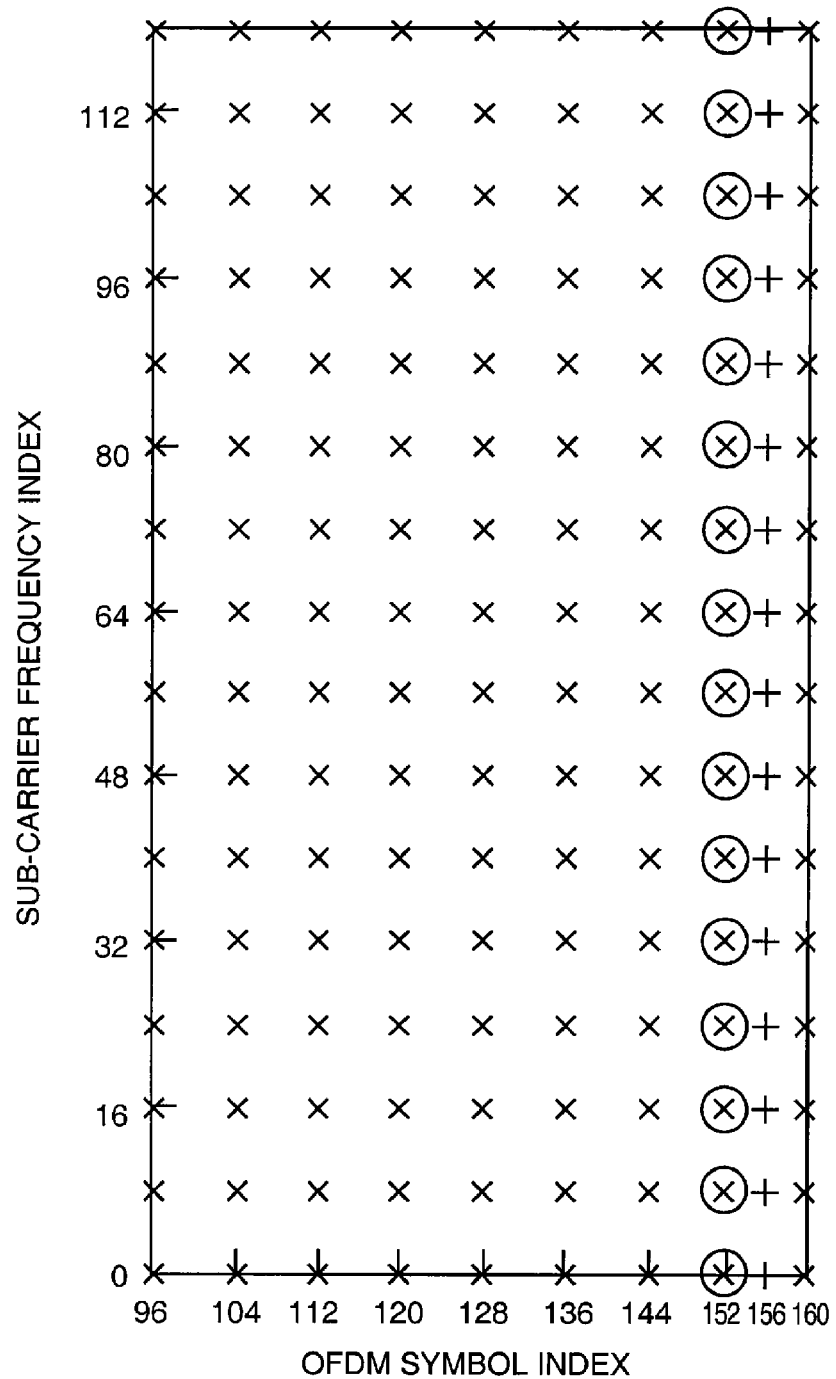
FIG. 5 illustrates a time-frequency plot diagram of a reduced-density OFDM pilot signal and adaptively allocated pilot symbols.

FIG. 5 illustrates an exemplary reduced-density OFDM common pilot signal generated according to the embodiments disclosed herein. Like the common pilot signal of FIG. 4, the reduced-density common pilot signal includes pilot symbols regularly spaced in time and frequency. However, the reduced-density common pilot signal is based on a sampling rate of approximately 1.25 times the Nyquist rate of the same communication channel for which the conventional OFDM common pilot signal of FIG. 4 is based. The reduced-density common pilot signal includes a common pilot symbol transmitted every $8^{th}$ OFDM symbol instead of every $5^{th}$ symbol, thus reducing pilot symbol density and correspondingly increasing data symbol density. For ease of explanation only, the common pilot signals of FIGS. 4 and 5 have the same pilot symbol spacing in the frequency domain. However, those skilled in the art will readily recognize the reduced-density common pilot signal may also have reduced pilot symbol density in the frequency domain.

With this understanding, each mobile device 108, 110 includes a baseband processor 130 for processing signals received from the BSS 126 over a forward communication link which includes, but is not limited to, channel estimation and coherent data symbol demodulation. The mobile baseband processor 130 may also generate data symbols, a reduced-density common pilot signal or nothing at all and may also allocate additional pilot symbols when needed by the BSS baseband processor 128 for accurately estimating channel response over a reverse communication link. The method "begins" with the mobile device 108, 110 receiving a reduced-density common pilot signal from the BSS 126 (Step 300).

The method continues by determining whether the mobile device 108, 110 can accurately estimate channel response based only on the reduced-density common pilot signal (Step 302). In one embodiment, the mobile device 108, 110 transmits a pilot signal to the BSS 126 over a reverse link. The BSS baseband processor 128 blindly determines whether the mobile device 108, 110 requires one or more additional pilot symbols based on the reverse link pilot signal. In another embodiment, the mobile baseband processor 130 determines whether additional pilot symbols are needed, e.g., based on the speed of the mobile device or dispersiveness of the channel. The mobile device 108, 110 then sends a control signal to the BSS 126 indicating whether additional pilot symbols are needed for accurate channel response estimation.

Either way, the method continues with the mobile baseband processor 130 estimating channel response based only on the reduced-density common pilot signal when additional pilot symbols are not needed to accurately estimate channel response (Step 304). However, if one or more additional pilot symbols are needed before the next regularly-scheduled common pilot symbol arrives, the BSS baseband processor 128 allocates one or more additional pilot symbols to the mobile device 108, 110. The mobile device 108, 110 receives the one or more additional pilot symbols allocated by the BSS baseband processor 128 (Step 306). The mobile baseband processor 130 then performs channel estimation based on previously received common pilot symbols and the one or more additional pilot symbols allocated to the mobile device 108, 110 (Step 308). The mobile device 108, 110 does not wait for the next regularly-scheduled common pilot symbol to perform channel estimation (e.g., the $160^{th}$ OFDM symbol in FIG. 5). Instead, the mobile baseband processor 130 performs channel estimation in response to receiving the additional pilot symbol allocated by the BSS baseband processor 128 (e.g., the $156^{th}$ OFDM symbol in FIG. 5). The channel response estimate derived by the mobile baseband processor 130 is used to coherently demodulate received data symbols as is well known in the art (Step 310).

The channel response estimation process is described next in more detail with reference to OFDM signals for ease of explanation only. The discrete frequency domain of a received OFDM sample can be expressed as:

$$X[t,f]=H[t,f]\Lambda[t,f]+Z[t,f] \quad (2)$$

where the index (t, f) corresponds to the $f^{th}$ sub-carrier and the $t^{th}$ OFDM symbol, H[t, f] is the channel's time-frequency response at that point, $\Lambda$[t, f] is the transmitted symbol and Z[t, f] is Additive White Gaussian Noise (AWGN). On a forward link, the mobile baseband processor 130 uses a time-frequency estimate of the channel response to perform coherent demodulation for recovering modulated data symbols. Similarly, the BSS baseband processor 128 uses a time-frequency estimate of the channel response to perform coherent demodulation for recovering modulated data symbols on a reverse link. In either case, the time-frequency channel response estimates are based at least in-part on the reduced-density common pilot signal.

Reduced-density common pilot observations can be concisely expressed in a matrix form arranged into a column vector as given by:

$$X_c = \Lambda_c H_c + Z_c \tag{3}$$

where $\Lambda_c$ is a diagonal matrix containing the reduced-density common pilot symbols as its diagonal elements. $X_c$, $H_c$ and $Z_c$ are column vectors of the same size corresponding to the common pilot observation, channel response and noise, respectively. The subscript c denotes the observation corresponding to the reduced-density common pilot signal regularly spaced in time and frequency. The number of reduced-density common pilot symbols may be expressed as N, i.e., $\Lambda_c$ is an N×N matrix and the three vectors $X_c$, $H_c$ and $Z_c$ are of dimension N×1.

Similarly, using the subscript d, the observation corresponding to adaptively allocated pilot symbols used to estimate channel response when the reduced-density common pilot signal is insufficient may be expressed as:

$$X_d = \Lambda_d H_d + Z_d. \tag{4}$$

Observations associated with the reduced-density common pilot signal and the adaptively allocated pilot signal may be stacked in a column vector as given by:

$$\begin{bmatrix} X_c \\ X_d \end{bmatrix} = \begin{bmatrix} \Lambda_c & 0 \\ 0 & \Lambda_d \end{bmatrix} \begin{bmatrix} H_c \\ H_d \end{bmatrix} + \begin{bmatrix} Z_c \\ Z_d \end{bmatrix}, \tag{5}$$

where the subscript t is introduced to indicate that both reduced-density and adaptively allocated pilot symbols are included in the expression. The total pilot observation may be expressed in a similar matrix form as given by:

$$X_t = \Lambda_t H_t + Z_t. \tag{6}$$

The channel response H[t, f] may be modeled as a two-dimensional zero-mean Wide Sense Stationary (WSS) Gaussian random process. Correspondingly, its correlation may be expressed by:

$$\Gamma[t_1-t_2, f_1-f_2] = E\{H[t_1,f_1]H^*[t_2,f_2]\} \tag{7}$$

and is commonly assumed known or can be estimated from past observations. Given the matrix representations of equations (3), (4) and (6) and the knowledge of channel statistics, a linear estimator such as an MMSE estimator can be formulated for each of the three pilot observations. That is, a linear estimator may be derived based on only the reduced-density common pilot observations, only on the adaptively allocated pilot observations, or both.

Estimating channel response based only on reduced-density common pilot observations as illustrated by Step 304 of FIG. 3 is described next in more detail. Let H denote the L×1 column vector containing the channel response at locations where it needs to be estimated in the time-frequency plane. For example, L=6×120 points between 152<t≦156 and 0≦f<120 for the exemplary common pilot signals shown in FIG. 5. The MMSE estimate of H based only on the common pilot symbols is its mean conditioned on the observation $X_c$ as given by:

$$\hat{H}(X_c) = E\{H|X_c\} = \Pi_{HX_c} \Pi_{C_c}^{-1} X_c \tag{8}$$

$$= \Pi_{HH_c} \Lambda_c^H (\Lambda_c \Pi_{H_c} \Lambda_c^H + \sigma_Z^2 I)^{-1} X_c,$$

where $\Pi_{H_c} = E\{H_c H_c^H\}$ denotes the N×N auto covariance matrix of $H_c$, $\Pi_{HH_c} = E\{HH_c^H\}$ is the L×N covariance matrix between H and $H_c$ and $\Pi_{HX_c}$ is the similarly defined L×N covariance matrix between H and $X_c$.

Because the elements in the covariance matrices can be derived from the correlation function of the channel as given in equation (7), the MMSE estimator becomes an L×N linear operator that transforms the N×1 observation vector $X_c$ into the L×1 vector containing the estimates at the desired locations. Similarly, the MMSE estimate of H based only on adaptively allocated pilot observations also has the same matrix expression as equation (8), with the subscript c replaced by the subscript d.

The MMSE estimate which is based only on common pilot observations as given by equation (8) suffers from performance degradation as the time index becomes farther away from the last pilot symbols transmitted in time. That is, the accuracy of the MMSE estimate given in equation (8) decreases as the amount of time lapsed after receipt of the last common pilot symbol increases. An MMSE estimator based on the total pilot observation $X_t$ given in equation (6) may be used to improve channel estimation accuracy when waiting for the next regularly-scheduled common pilot symbol is not feasible. However, an MMSE estimator based on $X_t$ involves the inversion of a large kernel matrix which lacks the regular structure associated with a common pilot signal.

A sub-optimal, but reduced complexity approach that combines both the common and adaptively allocated pilot observations to achieve improved channel response estimation accuracy is described next. In one embodiment, an MMSE estimator is formed based on the adaptively allocated pilot signal and a few neighboring common pilot symbols to reduce the size of the kernel matrix. In another embodiment, a linear estimator such as an MMSE estimator is based on the adaptively allocated pilot signal and an estimated channel response derived from a subset of the reduced-density common pilot symbols. Preferably, the channel response estimate derived from the subset of common pilot symbols is generated at a location (e.g., in time and optionally frequency for OFDM systems) near an adaptively allocated pilot symbol for further improving estimation accuracy. For example, in FIG. 5, the channel response estimate is derived from neighboring common pilot symbols including the last common pilot symbol transmitted (the $152^{nd}$ OFDM symbol in FIG. 5) before transmission of the adaptively allocated pilot symbol (the $156^{th}$ OFDM symbol in FIG. 5). Accordingly, the channel response estimate derived from the subset (neighboring) common pilot symbols functions as an estimated pilot observation at the estimated pilot location.

The channel response estimate derived from neighboring common pilot symbols is already available since channel response estimates are continuously estimated in order to demodulate control information. Let $H_n$ denote the channel response at the estimated pilot location, then the MMSE estimate of $H_n$ is given by:

$$\hat{H}_n(X_c) = E\{H_n|X_c\} \tag{9}$$

-continued $$= \Pi_{H_n H_c} \Lambda_c^H (\Lambda_c \Pi_c \Lambda_c^H + \sigma_Z^2 I)^{-1} X_c$$
$$= W_n X_c, \qquad (9)$$

where $W_n$ is the corresponding linear operator. In equation (9), $W_n$ is not restricted to an MMSE estimator. Instead, $W_n$ can be any linear operator on an arbitrary subset of past common pilot symbol observations.

The estimated pilot observation $\hat{H}_n$ and the adaptively allocated pilot observation $X_d$ may be stacked in a column vector as given by:

$$X_m \equiv \begin{bmatrix} \hat{H}_n \\ X_d \end{bmatrix}, \qquad (10)$$

The corresponding MMSE estimator may then be expressed as:

$$\hat{H}(X_m) \equiv E\{H | X_m\} \qquad (11)$$
$$= \Pi_{HX_m} \Pi_{X_m}^{-1} X_m,$$

where $$\Pi_{HX_m} = [\Pi_{HH_c} \Lambda_c^H W_n^H \quad \Pi_{HH_d} \Lambda_d^H] \qquad (12)$$

$$\Pi_{X_m} = \begin{bmatrix} W_n (\Lambda_c \Pi_{H_c} \Lambda_c^H + \sigma_Z^2 I) W_n^H & W_n \Lambda_c \Pi_{H_c H_d} \Lambda_d^H \\ \Lambda_d \Pi_{H_c H_d}^H \Lambda_c^H W_n^H & \Lambda_d \Pi_{H_d} \Lambda_d^H + \sigma_Z^2 I \end{bmatrix}.$$

Since the dimension of the kernel matrix $\Pi_{X_m}$ is only a fraction of the dimension of $\Pi_{X_t}$, the kernel matrix of the MMSE estimator based on both pilot observations, and thus easier to invert. The performance loss of the reduced complexity estimator is minimal.

The adaptive pilot symbol allocation teachings disclosed herein improve overall data symbol density in the wireless communication system 100 by transmitting common pilot symbols at a rate slightly above the Nyquist rate. Pilot signal overhead can be lowered even further if the pilot symbol insertion rate is set to cover only a reduced number of channel conditions, e.g., 95% of channel conditions. Additional pilot symbols are adaptively transmitted only to those receiving devices requiring additional pilot symbols for accurately estimating channel response. That is, additional pilot symbols are adaptively transmitted to receiving devices having stringent delay requirements or which are subject to extreme channel conditions, e.g., conditions that occur only 5% of the time. The sub-optimal, reduced-complexity linear estimator disclosed herein reduces receiver complexity since it operates on adaptively allocated pilot symbols and a subset of previously received reduced-density common pilot symbols.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. In a wireless communication device, a method of estimating channel response comprising:

estimating the channel response based on a reduced-density common pilot signal when the reduced-density common pilot signal is sufficient for estimating the channel response with a desired accuracy, the reduced-density common pilot signal comprising a plurality of regularly spaced common pilot symbols; and estimating the channel response based on the reduced-density common pilot signal and one or more additional pilot symbols adaptively allocated to the wireless communication device when the reduced-density common pilot signal is insufficient for estimating the channel response with the desired accuracy.

2. The method of claim 1, wherein estimating the channel response based on the reduced-density common pilot signal and the one or more additional pilot symbols comprises calculating a minimum mean-square error estimate of the channel response based on the common pilot symbols and the one or more additional pilot symbols.

3. The method of claim 2, wherein calculating the minimum mean-square error estimate of the channel response comprises calculating the minimum mean-square error estimate based on the one or more additional pilot symbols and a selected subset of the common pilot symbols.

4. The method of claim 1, wherein estimating the channel response based on the reduced-density common pilot signal and the one or more additional pilot symbols comprises estimating the channel response based on the one or more additional pilot symbols and a channel response estimate derived from a selected subset of the common pilot symbols at a location near one of the additional pilot symbols.

5. The method of claim 4, further comprising deriving a linear estimate of the channel response from the selected subset of the common pilot symbols at the location near the additional pilot symbol.

6. The method of claim 5, wherein deriving a linear estimate of the channel response from the selected subset of the common pilot symbols at the location near the additional pilot symbol comprises deriving a minimum mean-square error estimate of the channel response from the selected subset of the common pilot symbols at the location near the additional pilot symbol.

7. The method of claim 1, further comprising blindly detecting the one or more additional pilot symbols.

8. The method of claim 1, further comprising receiving a signal indicating that the one or more additional pilot symbols have been adaptively allocated to the wireless communication device.

9. A wireless communication device comprising a baseband processor configured to:

estimate channel response based on a reduced-density common pilot signal when the reduced-density common pilot signal is sufficient for estimating the channel response with a desired accuracy, the reduced-density common pilot signal comprising a plurality of regularly spaced common pilot symbols; and estimate the channel response based on the reduced-density common pilot signal and one or more additional pilot symbols adaptively allocated to the wireless communication device when the reduced-density common pilot signal is insufficient for estimating the channel response with the desired accuracy.

10. The wireless communication device of claim 9, wherein the baseband processor is configured to calculate a minimum mean-square error estimate of the channel response based on the common pilot symbols and the one or more additional pilot symbols.

11. The wireless communication device of claim 10, wherein the baseband processor is configured to calculate the minimum mean-square error estimate based on the one or more additional pilot symbols and a selected subset of the common pilot symbols.

12. The wireless communication device of claim 9, wherein the baseband processor is configured to estimate the channel response based on the one or more additional pilot symbols and a channel response estimate derived from a selected subset of the common pilot symbols at a location near one of the additional pilot symbols.

13. The wireless communication device of claim 12, wherein the baseband processor is further configured to derive a linear estimate of the channel response from the selected subset of the common pilot symbols at the location near the additional pilot symbol.

14. The wireless communication device of claim 13, wherein the baseband processor is configured to derive a minimum mean-square error estimate of the channel response from the selected subset of the common pilot symbols at the location near the additional pilot symbol.

15. The wireless communication device of claim 9, wherein the baseband processor is further configured to blindly detect the one or more additional pilot symbols.

16. The wireless communication device of claim 9, wherein the baseband processor is further configured to process a received signal indicating that the one or more additional pilot symbols have been adaptively allocated to the wireless communication device.

17. A method of adaptively altering pilot symbol density within a wireless communication system, comprising:
    transmitting a reduced-density common pilot signal comprising a plurality of regularly spaced common pilot symbols;
    determining whether a wireless communication device in communicative contact with the wireless communication system can estimate channel response with a desired accuracy based on the reduced-density common pilot signal; and
    allocating one or more additional pilot symbols to the wireless communication device when the wireless communication device cannot estimate the channel response with the desired accuracy based on the reduced-density common pilot signal.

18. The method of claim 17, wherein determining whether the wireless communication device can estimate channel response with a desired accuracy based on the reduced-density common pilot signal comprises processing a signal received from the wireless communication device indicating whether the wireless communication device can estimate the channel response with the desired accuracy based on the reduced-density common pilot signal.

19. The method of claim 17, wherein determining whether the wireless communication device can estimate channel response with a desired accuracy based on the reduced-density common pilot signal comprises blindly processing a pilot signal received from the wireless communication device.

20. The method of claim 17, wherein allocating the one or more additional pilot symbols to the wireless communication device comprises replacing one or more data symbols scheduled for transmission to the wireless communication device with a pilot symbol.

21. The method of claim 17, further comprising indicating to the wireless communication device that the one or more additional pilot symbols have been allocated to the wireless communication device.

22. A wireless communication device comprising a baseband processor configured to:
    generate a reduced-density common pilot signal comprising a plurality of regularly spaced common pilot symbols;
    determine whether a second different wireless communication device in communicative contact with the wireless communication device can estimate channel response with a desired accuracy based on the reduced-density common pilot signal; and
    allocate one or more additional pilot symbols to the second wireless communication device when the second wireless communication device cannot estimate the channel response with the desired accuracy based on the reduced-density common pilot signal.

23. The wireless communication device of claim 22, wherein the baseband processor is configured to process a signal received from the second wireless communication device indicating whether the second wireless communication device can estimate the channel response with the desired accuracy based on the reduced-density common pilot signal.

24. The wireless communication device of claim 22, wherein the baseband processor is configured to blindly process a pilot signal received from the second wireless communication device to determine whether the second wireless communication device can estimate the channel response with the desired accuracy based on the reduced-density common pilot signal.

25. The wireless communication device of claim 22, wherein the baseband processor is configured to replace one or more data symbols scheduled for transmission to the second wireless communication device with a pilot symbol.

26. The wireless communication device of claim 22, wherein the baseband processor is further configured to generate a signal indicating to the second wireless communication device that the one or more additional pilot symbols have been allocated to the second wireless communication device.

* * * * *

UNITED STATES PATENT AND TRADEMARK OFFICE
CERTIFICATE OF CORRECTION

| | | |
|---|---|---|
| PATENT NO. | : 7,848,468 B2 | Page 1 of 1 |
| APPLICATION NO. | : 11/743332 | |
| DATED | : December 7, 2010 | |
| INVENTOR(S) | : Guey et al. | |

It is certified that error appears in the above-identified patent and that said Letters Patent is hereby corrected as shown below:

In Column 10, Line 3, in Equation (8), delete "$= \Pi_{HX_c} \Pi_{C_c}^{-1} X_c$," and insert -- $= \Pi_{HX_c} \Pi_{X_c}^{-1} X_c$ --, therefor.

Signed and Sealed this
Fifth Day of February, 2013

Teresa Stanek Rea
*Acting Director of the United States Patent and Trademark Office*